(12) United States Patent
Verhoog

(10) Patent No.: US 10,174,805 B2
(45) Date of Patent: Jan. 8, 2019

(54) SIMPLIFIED TORSION DAMPING DEVICE HAVING PENDULUM

(71) Applicant: VALEO EMBRAYAGES, Amiens (FR)

(72) Inventor: Roel Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 190 days.

(21) Appl. No.: 15/034,416

(22) PCT Filed: Nov. 13, 2014

(86) PCT No.: PCT/FR2014/052895
§ 371 (c)(1),
(2) Date: May 4, 2016

(87) PCT Pub. No.: WO2015/071601
PCT Pub. Date: May 21, 2015

(65) Prior Publication Data
US 2016/0273613 A1   Sep. 22, 2016

(30) Foreign Application Priority Data
Nov. 15, 2013   (FR) ...................................... 13 61175

(51) Int. Cl.
*F16F 15/14*   (2006.01)
(52) U.S. Cl.
CPC ...... *F16F 15/145* (2013.01); *F16F 2228/001* (2013.01)

(58) Field of Classification Search
CPC .......... F16F 15/14; F16F 15/145; F16F 15/20; F16F 15/22; F16F 15/28; F16F 15/30; F16F 15/31; F16F 2228/001
See application file for complete search history.

(56) References Cited

U.S. PATENT DOCUMENTS

| | | | | |
|---|---|---|---|---|
| 8,910,762 | B2 * | 12/2014 | Takikawa | F16F 15/145 188/378 |
| 9,328,796 | B2 * | 5/2016 | Movlazada | F16F 15/145 |
| 9,506,525 | B2 * | 11/2016 | Verhoog | F16F 15/145 |
| 9,689,452 | B2 * | 6/2017 | Ray | F16F 7/10 |

(Continued)

FOREIGN PATENT DOCUMENTS

| | | | | |
|---|---|---|---|---|
| DE | 102011088925 | | 6/2013 | |
| DE | 102013217091 | A1 * | 3/2015 | ............ F16F 15/145 |

(Continued)

*Primary Examiner* — Adam D Rogers
(74) *Attorney, Agent, or Firm* — Berenato & White, LLC

(57) ABSTRACT

A pendulum-type torsional damping device comprises oscillating masses (6, 8, 10) mounted movably on a support (4). Each oscillating mass (6) is intercalated circumferentially between a first adjacent oscillating mass (8) and a second adjacent oscillating mass (10). Each oscillating mass (6) is mounted movably on the support (4) by a rolling contact via a single bearing element (12) associated with that oscillating mass, and a sliding contact between one of terminal edges (18) thereof and a terminal edge (20) of the second adjacent oscillating mass (10), which forms a radial retention edge for that oscillating mass (6). The device allows effective pendulum damping to be obtained with a limited number of bearing elements.

17 Claims, 2 Drawing Sheets

(56) References Cited

U.S. PATENT DOCUMENTS

| | | | |
|---|---|---|---|
| 2010/0122605 A1* | 5/2010 | Maienschein | F16F 15/1457 74/574.2 |
| 2016/0195164 A1* | 7/2016 | Verhoog | F16F 15/145 74/574.2 |
| 2016/0348753 A1* | 12/2016 | Verhoog | F16F 15/145 |
| 2017/0030430 A1* | 2/2017 | Maienschein | F16F 15/145 |

FOREIGN PATENT DOCUMENTS

| | | | | |
|---|---|---|---|---|
| FR | 1045551 | | 11/1953 | |
| FR | 2856453 A1 | * | 12/2004 | ............. F16H 45/02 |
| FR | 3013414 B1 | * | 5/2016 | .......... F16F 15/145 |
| GB | 2413614 | | 11/2005 | |

\* cited by examiner

SIMPLIFIED TORSION DAMPING DEVICE HAVING PENDULUM

CROSS-REFERENCE TO RELATED APPLICATIONS AND CLAIM TO PRIORITY

This application is a national stage application of International Application No. PCT/FR2014/052895 filed Nov. 13, 2014, which claims priority to French Patent Application No. 1361175 filed Nov. 15, 2013, the disclosures of which are incorporated herein by reference and to which priority is claimed.

FIELD OF THE INVENTION

The present invention relates to a simplified torsional damping device of the pendulum oscillator type, intended to be connected to a combustion engine.

BACKGROUND OF THE INVENTION

Pendulum-type torsional damping devices, also called pendulum oscillators or pendulums, which in particular but not exclusively are part of the transmission of a motor vehicle, are known from the existing art.

In a motor vehicle transmission at least one torsional damping device is generally associated with a clutch capable of selectively connecting the engine to the gearbox, such as a friction clutch or a hydrokinetic coupling device having a lockup clutch, the purpose being to filter vibrations due to engine irregularities.

This is because a combustion engine exhibits irregularities due to the successive combustion events in the engine cylinder, said irregularities varying in particular as a function of the number of cylinders.

The damping means of a torsional vibration damper consequently have the task of filtering vibrations caused by the irregularities, and they act before driving torque is transmitted to the gearbox.

Otherwise the vibrations penetrate into the gearbox, where they would cause particularly undesirable impacts, noise, or acoustic annoyances during operation.

This is one of the reasons for using one or more damping means capable of filtering vibrations at at least one defined frequency.

The document U.S. 2010/122605 describes a damping device of the pendulum type.

The damping device comprises at least one support rotationally coupled to an engine shaft and at least one oscillating mass, generally several oscillating masses circumferentially distributed on the support. The oscillations of these oscillating masses generate an oscillating torque that acts against the oscillating torque coming from the engine and thus absorbs a portion of the engine's irregularities. The support, sometimes called a "phase washer," of the torsional damping device is typically integral with the driving shaft.

Each oscillating mass is generally constituted by a pair of flyweights arranged on either side of the support and integral with one another either by way of a direct mechanical connection, typically through an opening of the support, or by means of a spacer. An assemblage of this kind of two flyweights integrated face to face, with or without a spacer, is regarded hereinafter as a single oscillating mass.

Alternatively, each oscillating mass can be a single flyweight mounted movably on the support. In this case the support can optionally be constituted by two elements, the oscillating masses being arranged movably between those two elements.

An oscillating mass of this kind is very generally mounted movably on the support by means of at least one bearing element, typically via two bearing elements or even more.

Typically the center of mass of each oscillating mass is free to oscillate around an oscillation axis substantially parallel to the rotation axis of the engine shaft and driven rotationally around that rotation axis.

The oscillating masses move in reaction to the rotational inconsistencies in such a way that the center of mass of each of them oscillates around that oscillation axis.

The radial position of the center of mass of each of the oscillating masses with respect to the rotation axis of the driving shaft, as well as the distance of that center of gravity with respect to the oscillation axis, are established so that in response to centrifugal forces, the oscillation frequency of each of the oscillating masses is proportional to the rotation speed of the driving shaft, that multiple being capable of assuming, for example, a value close to the preponderant harmonic order of the irregularities.

The desire for increasingly effective vibration filtering is leading to refinements of pendulum-type torsional damping devices.

It was found in particular that the use of a pendulum comprising two bearing elements (or rollers) for each oscillating mass, called a "bifilar pendulum," yielded better damping performance than a pendulum comprising only one bearing element for each oscillating mass, called a "monofilar pendulum."

The existing art thus leads to a choice between using a bifilar pendulum that performs well but is of complex design, and a monofilar pendulum that has a relatively simple design but relatively modest performance.

SUMMARY OF THE INVENTION

One of the aims of the invention is to allow implementation of a torsional damping device of the pendulum type which offers a degree of design simplicity close to that of a monofilar pendulum but with which damping performance close to that of a bifilar pendulum can be achieved.

To that end, an object of the invention is a device intended to be connected to a combustion engine, that device comprising a support rotationally movable around an axis, and an assemblage of oscillating pendulum masses mounted movably on that support, each of the oscillating masses of the assemblage being intercalated circumferentially between a first oscillating mass that is adjacent to it and a second oscillating mass that is adjacent to it, and forming with these two adjacent masses a group of three circumferentially consecutive oscillating masses belonging to said assemblage, hereinafter called respectively the "intercalated mass," "first adjacent mass," and "second adjacent mass,"

in which each of the oscillating masses of the assemblage is mounted movably on the support by means of a single bearing element associated with that oscillating mass, and for any group of three circumferentially consecutive oscillating masses, the intercalated mass comprises:

a first terminal edge capable, during a rotation of the device, of coming into substantially circumferential sliding contact with a terminal edge of the first adjacent mass;

a second terminal edge capable, during a rotation of the device, of coming into substantially circumferential sliding contact with a terminal edge of the second adjacent mass, the terminal edge of the first adjacent mass or of the second adjacent mass being capable, during a rotation of the device, of radial retention respectively of the first or of the second terminal edge of the intercalated mass, and in which for each of the oscillating masses, the bearing element rolls on the support and on the oscillating mass.

Hereinafter the term "oscillating pendulum mass" (or "intercalated mass," "first adjacent mass," or "second adjacent mass") designates any oscillating pendulum mass whose constituent element or elements are mechanically integral. This relates in particular to two flyweights integral with one another (for example by means of a spacer), typically arranged on either side of the support; and, as appropriate, to the spacer. The term "pendulum mass" also applies generally to other geometries of mechanically integral masses, for example to a single flyweight arranged along a support or between two elements of a single support.

The bearing element can be any appropriate rolling element, for example a roller having a single diameter or several diameters corresponding to different bearing races, for example on the support and on the flyweights.

In an embodiment of the invention the bearing element is inserted through an opening formed by the support. The bearing element is thus capable of rolling along a first bearing race formed by the spacer and along a second bearing race formed by a rim delimited by the opening of the support. The bearing element is capable of rolling on the support and on the spacer. In a conventional bifilar pendulum every oscillating pendulum mass is in contact with two bearing elements and is retained radially (maintaining a radial distance) in two regions that are the locations of the contact points between that mass and the two bearing elements. This ensures both that the mass is stable in terms of its pendulum motion (in particular, preventing any uncontrolled pivoting) and that a bifilar effect is obtained, this being the source of a damping effectiveness greater than that of a monofilar pendulum having a single bearing element.

According to the invention one of the bearing elements is suppressed as compared with an oscillating mass of a conventional bifilar pendulum, and the corresponding radial retention effect that is thereby suppressed is achieved by a substantially circumferential sliding contact with one of the adjacent masses. This therefore causes friction, which is typically undesirable and is sometimes referred to by one skilled in the art as a "source of hysteresis" (or "source of irreversibility").

The hysteresis effect produced by this sliding contact is nevertheless relatively limited or indeed very limited according to the invention, since the assemblage of oscillating pendulum masses of the device according to the present invention operates in coordinated fashion, so that the travel of a sliding contact point is much shorter than the travel of the corresponding contact point of the pendulum mass with the single bearing element. In other words, the bearing element rolls with a deflection of the contact point with the bearing race on the oscillating mass which is much greater than the deflection of a corresponding sliding contact point.

The first and second adjacent masses thus typically exhibit, at a given time, a circumferential motion coordinated with that of the intercalated mass and substantially in the same direction (collective rotational motion), and/or a pivoting motion that is likewise coordinated and in the same direction, and/or a radial displacement motion that is likewise coordinated and in the same direction (centrifugal or centripetal), so that the relative motion of the sliding contact point between the intercalated mass and either one of the first and the second adjacent mass has an amplitude much lower than that of the motion of the intercalated mass.

Considering now the assemblage of oscillating masses, these typically exhibit at a given time a coordinated circumferential motion, for example clockwise, and a coordinated pivoting motion and/or a coordinated radial motion (for example, centripetal).

It is thus possible to obtain with the invention a coordinated kinematic motion of the oscillating masses which is substantially close to that of the oscillating masses of a conventional bifilar pendulum comprising oscillating masses connected to one another. This is because the limited effect of friction (due to a small deflection of the sliding contact points) allows a considerable reduction in the kinematic functional difference between the device according to the present invention and the aforesaid bifilar pendulum.

With the device according to the present invention it is thus possible to achieve damping performance similar to that of a bifilar pendulum while halving the number of bearing elements.

In addition, the various oscillating masses are in contact with one another, hence adjacent (or even nested pairwise as is evident from the attached Figures), which allows better utilization of all the circumferential space for placement of the overall oscillating mass, which can thus be enlarged. In a pendulum system having independent masses, on the other hand, an open functional space must be provided between two circumferentially consecutive pendulum masses, that space not being used for installation of part of the overall pendulum mass. The situation is similar when pendulum masses connected by non-pendulum connecting elements are used.

The overall pendulum mass can thus typically be increased in the device according to the present invention, which improves damping (or alternatively allows the same overall pendulum mass to be arranged in a smaller space).

Preferably, for any oscillating mass the single associated bearing element is capable of rolling on a bearing race of that oscillating mass, the track of the contact points between the bearing element and the bearing race in a plane perpendicular to the axis comprising a median point that is offset angularly with respect to the center of mass of the oscillating mass. The reason is that it was found that this arrangement allowed an increase in the stability of the pendulum device.

For even greater stability, preferably each point on the track is offset angularly in the same circumferential direction with respect to the center of mass of the oscillating mass.

Also typically, the median point, and preferably any point on the track corresponding to an oscillating mass, is offset in the same circumferential direction for all the oscillating masses.

According to a preferred arrangement, for any intercalated mass:

the median point of the track is offset toward the first adjacent mass;

the first terminal edge is an edge capable, during a rotation of the device, of radially retaining said terminal edge of the first adjacent mass;

the terminal edge of the second adjacent mass is an edge capable, during a rotation of the device, of radially retaining the second terminal edge of the intercalated mass.

Centrifugal force is thus exerted on the intercalated mass along an axis passing between the median point on the one hand (point of radial retention by the bearing element) and the terminal edge of the second adjacent mass (forming the radial retention of the second terminal edge of the intercalated mass). The intercalated mass is thus stable, centrifugal force being exerted between the two radial retention elements.

The following condition is preferably met for an intercalated mass, and preferably for any oscillating mass:

$0.5 \times R1 < R2 < 2 \times R1$, in which

R1 is the radius of curvature of the track at the median point;
R2 is the radius of curvature of said terminal edge of said second adjacent mass at the contact point with the second terminal edge of the intercalated mass when the bearing element is in contact with the median point.

This improves the dynamic stability of the device and its damping performance.

According to another preferred arrangement the following condition is met for an oscillating mass and preferably for any oscillating mass:

$2CH \times DM < FC \times d < 5CH \times DM$, where

FC is the centrifugal force exerted on the oscillating mass during rotation of the device at 1000 rpm;
d is the distance from the center of mass of the oscillating mass to an axis that, when the bearing element is in contact with the median point, passes on the one hand through that median point and on the other hand through an associated contact point of the bearing element with the support;
CH is the frictional force between the oscillating mass and the support during a maximum axial acceleration of the support caused by vibration of the device during rotation;
DM is the maximum distance of the center of mass of the oscillating mass from an axis that passes through a contact point between the oscillating mass and the support, that axis being perpendicular to a radial direction at that contact point.

It was found that with this condition it was possible to prevent, very reliably, any disruption in operation of the device due to friction between the oscillating mass and the support, caused by axial vibrations of the latter during operation.

Typically, for an oscillating mass and preferably for any oscillating mass, d is between 2 mm and 12 mm, and preferably between 3.5 mm and 8 mm.

Also typically, any intercalated mass is capable of performing a substantially circumferential deflection of between 0.5 and 6 mm, and preferably between 1.5 mm and 3.5 mm, with each of the first and second adjacent masses.

According to another preferred arrangement, the number N of oscillating masses is an odd number greater than or equal to 3, preferably equal to 5 or to 7. This is because it was found that the operating stability of the device was further increased with an odd number of oscillating masses, the preferred numbers being 5 and 7, with the result that excellent stability can be obtained with a relatively simple mechanical design.

Lastly, another object of the invention is a single, dual, or multiple clutch comprising a torsional damping device as defined previously.

BRIEF DESCRIPTION OF THE DRAWINGS

The invention will be better understood upon reading the description below, provided merely as an example and referring to the drawings, in which.

DETAILED DESCRIPTION OF THE PREFERRED EMBODIMENT(S)

Figure 1:
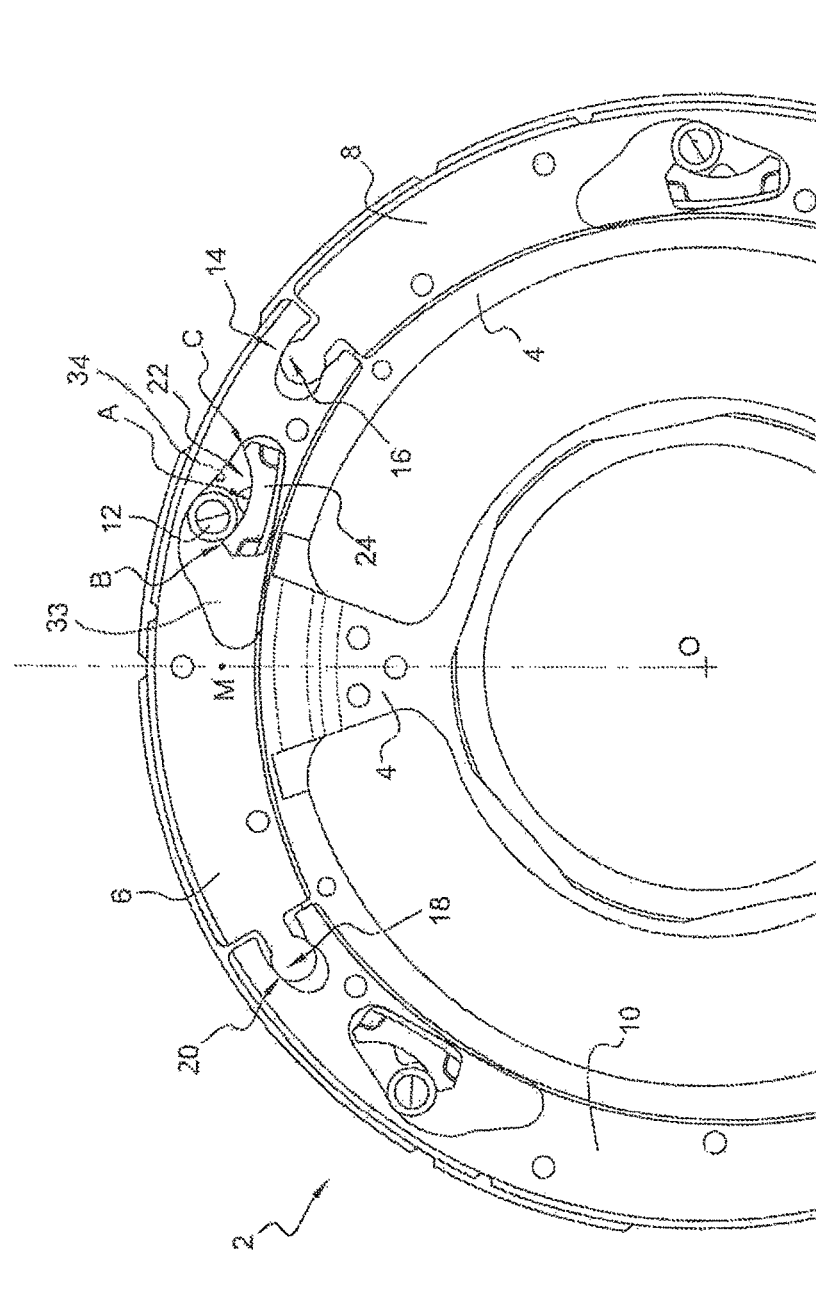
FIG. 1 is a simplified axial view of part of a torsional damping device according to the present invention, belonging to a clutch and comprising a pendulum support and several pendulum flyweights mounted on that support.

Reference is made now to FIG. 1, which schematically and partially depicts a torsional damping device 2 comprising a support 4, comprising a peripheral part of generally annular planar shape, on which are movably mounted a plurality of oscillating pendulum masses distributed circumferentially on said support 4.

Support 4, sometimes called a "phase washer," of the torsional damping device is mounted movably around an axis perpendicular to the plane of the Figure and passing through a point O, hereinafter called "the axis" if no complementary definition is provided. Support 4 carries oscillating pendulum masses each comprising two flyweights having the same angular position with respect to the axis and arranged on either side of said support 4, as well as a connecting spacer between the flyweights.

Figure 2:
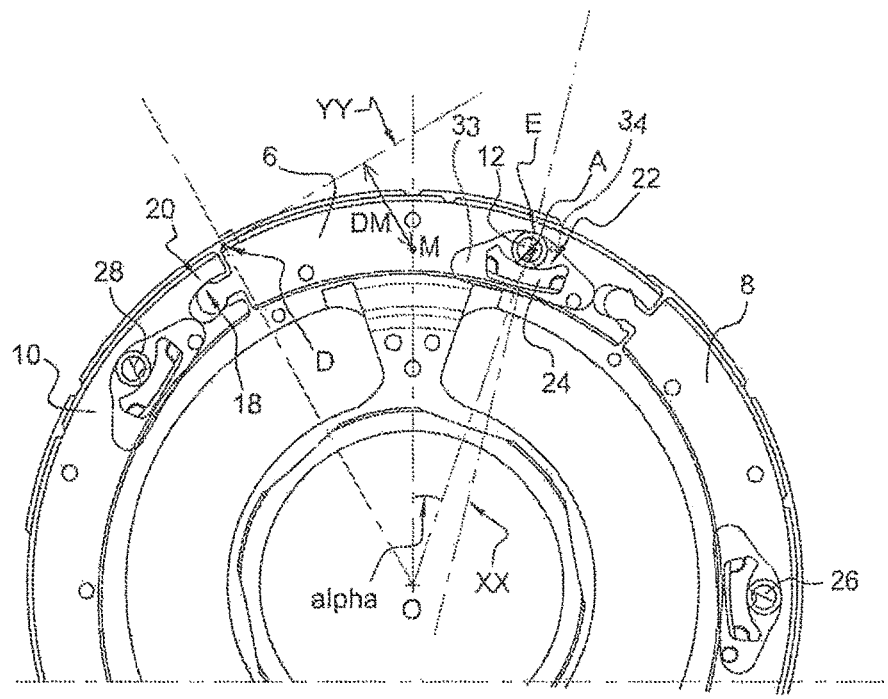
FIG. 2 is a view similar to FIG. 1, the damping device being in a different operating configuration.
Figure 3:
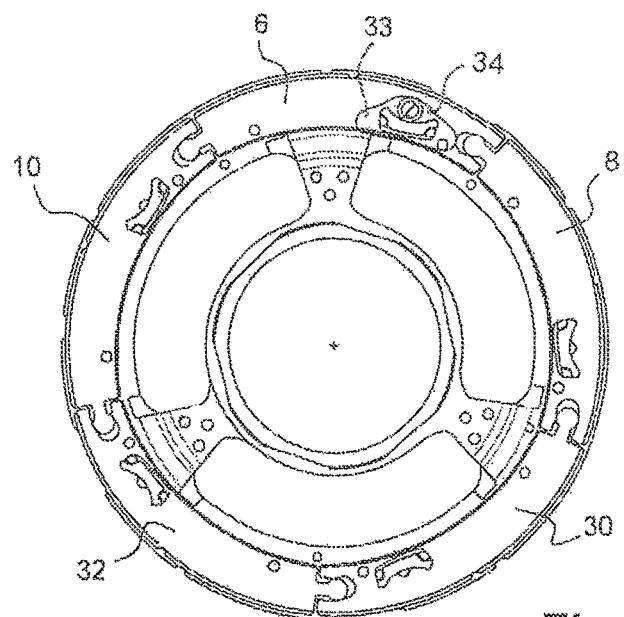
FIG. 3 is a view similar to FIG. 1, depicting certain elements not shown in FIG. 1.

In FIG. 1, FIG. 2, and in part of FIG. 3, only one of the flyweights is depicted for each oscillating pendulum mass. One such flyweight is in fact arranged in the background behind support 4 and is in fact only visible in these Figures by way of an artificial graphic depiction intended to better visualize the pendulum-type operation of the device. The corresponding reference numbers indicated below apply systematically to an oscillating pendulum mass and not to each of the flyweights, even if only one flyweight is depicted.

Each of the oscillating masses of the assemblage is intercalated circumferentially between a first oscillating mass that is adjacent to it and a second oscillating mass that is adjacent to it, and forms with these two adjacent masses a group of three circumferentially consecutive oscillating masses belonging to said assemblage, hereinafter called respectively an intercalated mass 6, first adjacent mass 8, and second adjacent mass 10.

It is evident—and this will be explained better in the description of FIG. 3—that each pendulum mass of the device is a mass intercalated between two other pendulum masses, but can also be considered a "first adjacent mass" or a "second adjacent mass" depending on how the assemblage of three consecutive oscillating masses, and thus the mass referred to as "intercalated," are selected.

Each of the oscillating masses of the assemblage is mounted movably on support 4 by means of a single bearing element 12 associated with that oscillating mass, and for any group of three circumferentially consecutive oscillating masses, intercalated mass 6 comprises:
 a first terminal edge 14 capable, during a rotation of the device, of coming into substantially circumferential sliding contact with a terminal edge 16 of first adjacent mass 8;
 a second terminal edge 18 capable, during a rotation of the device, of coming into substantially circumferential sliding contact with a terminal edge 20 of second adjacent mass 10.

Intercalated mass 6 also comprises, besides two flyweights, a spacer 24 connecting the two flyweights. Support 4 has an opening 33 through which spacer 24 is arranged. The two flyweights of intercalated mass 6 are located on either side of support 4.

The single bearing element 12 associated with intercalated mass 6 is capable of rolling on a bearing race 22 of that intercalated mass 6, arranged on spacer 24.

Bearing element 12 is housed in opening 33 of support 4. Bearing element 12 is capable of rolling at the same time on spacer 24 as mentioned previously, and on support 4 thanks to contact by that same bearing element 12 on a rim 34 delimiting opening 33 of support 4.

The track of the contact points between that bearing element 12 and bearing race 22 in a plane perpendicular to the axis passes through a median point A that is offset angularly with respect to the center of mass M of intercalated mass 6. This track forms a curve segment between points B and C. It is also evident that each point of the track is offset angularly with respect to the center of mass M of mass 6 in the same circumferential direction (angular offset with respect to the axis OM).

When centrifugal force is exerted on intercalated mass 6, it is exerted along the axis OM. Intercalated mass 6, which is radially retained by the rolling contact with bearing element 12 in a region arranged angularly to the right of the axis OM in FIG. 1, consequently must also be radially retained to the left of the axis OM. This is achieved by terminal edge 20 of second adjacent mass 10, which forms a radial retention edge of second terminal edge 18 of intercalated mass 6.

Analogously, first terminal edge 14 of intercalated mass 6 is an edge capable, during a rotation of the device, of radially retaining terminal edge 16 of first adjacent mass 8.

The median point A, and typically any point on the track corresponding to an oscillating mass (considered as an intercalated mass), is offset in the same circumferential direction for all the oscillating masses, or clockwise as depicted in FIG. 1.

For any intercalated mass of the device (and this also applies to masses 8 and 10, each considered as an intercalated mass):
- the median point of the corresponding track is offset toward the corresponding first adjacent mass;
- the first terminal edge is an edge capable, during a rotation of the device, of radial retention of the terminal edge of the corresponding first adjacent mass;
- the terminal edge of the corresponding second adjacent mass is an edge capable, during a rotation of the device, of radial retention of the second terminal edge of the intercalated mass.

FIG. 2, which depicts the same device as in FIG. 1 but in a configuration different from that of FIG. 1, is now referred to: in FIG. 2, bearing element 12 is in contact at the median point A with spacer 24 of intercalated mass 6.

In FIG. 2, bearing elements 26 and 28 corresponding to the first and second adjacent masses 8 and 10 are referenced at the top, and geometric statements presented below are indicated.

Operation of the device will now be considered, for example during a change in drive torque starting with the configuration of FIG. 2:

As a result of a rotational acceleration load on the support, all the oscillating masses 6, 8, 10, etc. execute a rotational motion in coordinated fashion (collectively), for example clockwise, in order to reach the configuration of FIG. 1 and then (possibly) a maximum deflection configuration in which bearing element 12 is in contact with point B. The motion then reverses, and all the oscillating masses 6, 8, 10, etc. then collectively rotate counter-clockwise in order to reach the configuration of FIG. 2 and then (possibly) a maximum deflection configuration in which roller 12 is in contact with point C. The motion then reverses again, and so on. The deflections only reach the maximum values (bearing element 12 in contact at points B and C) in the context of extreme loads requiring maximum damping.

The motions of the oscillating masses thus comprise coordinated (collective) rotational motions, in the same direction for all the oscillating masses at a given time. But the motion of the oscillating masses is in fact very generally more complex and comprises collective motion components other than a simple rotation, typically a coordinated (collective) radial motion and/or a coordinated (collective) pivoting.

These other coordinated (collective) motions nevertheless typically involve a relative deflection between two adjacent masses which is relatively small with respect to the rotational motion, so that the relative slip at the level of the sliding contacts, for example between elements 14 and 16 or between elements 18 and 20, is relatively limited, which reduces friction.

The following condition is preferably met for an (or any) intercalated mass 6 (i.e. also for the other oscillating masses 8, 10, etc. by adapting the definition of the "first" and "second" adjacent masses):

$$0.5 \times R1 < R2 < 2 \times R1, \text{ in which}$$

R1 is the radius of curvature of the track at the median point A;

R2 is the radius of curvature of terminal edge 20 of said second adjacent oscillating mass at the contact point with second terminal edge 18 of the intercalated mass when the bearing element 12 is in contact with the median point A.

It was found that when the above condition was satisfied, the effectiveness of the damping device unexpectedly improved.

The device is moreover advantageously configured so that the second condition below is also met for an oscillating mass and preferably for any oscillating mass:

$$2CH \times DM < FC \times d < 5CH \times DM, \text{ in which}$$

FC is the centrifugal force exerted on the oscillating mass during rotation of the device at 1000 rpm;

d is the distance from the center of mass M of the oscillating mass to an axis XX that, when bearing element 12 is in contact with the median point A, passes on the one hand through that median point A and on the other hand through an associated contact point E of bearing element 12 with support 4;

CH is the frictional force between the oscillating mass and the support during a maximum axial acceleration of the support caused by vibration of the device during rotation;

DM is the maximum distance of the center of mass M of oscillating mass 6 from an axis YY passing through a contact point D between the oscillating mass and the support, said axis YY being perpendicular to a radial direction OD at that contact point D.

This imparts great stability to the damping device.

Also depicted in FIG. 2 is the angle alpha of the angular offset of the median point A from the center of mass M when bearing element 12 is in contact with mass 6 at the point A.

FIG. 3 depicts the same device as in FIGS. 1 and 2. There as in the other Figures, intercalated mass 6 is depicted with a single flyweight arranged in the background.

For the other oscillating masses 8, 10, 30, and 32, conversely, the corresponding flyweight located in front of support 4 has been depicted.

It is apparent that intercalated mass 6 is arranged between a first adjacent mass 8 and a second adjacent mass 10. Conversely, if the assemblage of the three masses 6, 8, and 30 is considered, mass 8 is the "intercalated mass," mass 30 the "first adjacent mass," and mass 6 the "second adjacent mass." The designations "intercalated mass," "first adjacent mass," and "second adjacent mass" are thus relative to the selection of any assemblage of three circumferentially consecutive oscillating masses, and are not absolute in nature.

More generally, one skilled in the art will be able to implement this invention in different embodiments or variants that are compatible with the invention, without departing from the framework of the invention. He or she will also use any adapted characteristic known from the existing art.

The invention claimed is:

1. A torsional damping device (2) intended to be connected to a combustion engine, the torsional damping device comprising:
    a support (4) rotationally movable around an axis of rotation;
    a plurality of single bearing elements (12, 26, 28); and
    an assemblage including a plurality of oscillating pendulum masses (6, 8, 10, 30, 32) each mounted movably on the support (4), each of the oscillating pendulum masses (6, 8, 10, 30, 32) of the assemblage being intercalated circumferentially between two adjacent oscillating pendulum masses so as to form at least one group of three circumferentially consecutive oscillating pendulum masses belonging to the assemblage;
    the at least one group of three consecutive oscillating pendulum masses including a first adjacent mass (8), a second adjacent mass (10) and an intercalated mass (6) intercalated circumferentially between the first adjacent mass adjacent thereto and the second adjacent mass adjacent thereto;
    each of the oscillating pendulum masses (6, 8, 10) of the assemblage mounted movably on the support (4) by one of the single bearing elements (12, 26, 28) associated with one of the oscillating pendulum masses, the intercalated mass (6) of the at least one group of three consecutive oscillating pendulum masses comprises:
        a first terminal edge (14) configured to, during a rotation of the torsional damping device, come into circumferential sliding contact with a terminal edge (16) of the first adjacent mass (8);
        a second terminal edge (18) configured to, during the rotation of the torsional damping device, come into circumferential sliding contact with a terminal edge (20) of the second adjacent mass (10),
    the terminal edge (16, 20) of the first adjacent mass (8) or of the second adjacent mass (10) being configured to radially retain, during the rotation of the torsional damping device, respectively the first terminal edge (14) or of the second terminal edge (18) of the intercalated mass (6), and
    each of the single bearing elements rolls on the support (4) and on one of the oscillating pendulum masses (6, 8, 10) so that each of the single bearing elements is moveable relative to both the support (4) and one of the oscillating pendulum masses (6, 8, 10).

2. The torsional damping device according to claim 1, wherein for each oscillating pendulum mass (6, 8, 10), the single bearing element (12, 26, 28), associated with one of the oscillating pendulum masses (6, 8, 10), is configured to roll on a bearing race (22) of the associated oscillating pendulum mass (6, 8, 10), and wherein a track of contact points between the single bearing element (12, 26, 28) and the bearing race (22) in a plane perpendicular to the axis comprises a median point (A) offset angularly with respect to a center of mass (M) of the associated oscillating pendulum mass (6, 8, 10).

3. The torsional damping device according to claim 2, wherein each contact point on the track is offset angularly in a same circumferential direction with respect to the center of mass (M) of the associated oscillating pendulum mass (6, 8, 10).

4. The torsional damping device according to claim 3, wherein:
    the median point (A) of the track is offset toward the first adjacent mass (8);
    the first terminal edge (14) of the intercalated mass (6) is an edge capable, during the rotation of the torsional damping device, of radially retaining the terminal edge (16) of the first adjacent mass (8);
    the terminal edge (20) of the second adjacent mass (10) is an edge capable, during the rotation of the torsional damping device, of radially retaining the second terminal edge (18) of the intercalated mass (6).

5. The torsional damping device according to claim 3, wherein the following condition is met for any of the oscillating pendulum masses:

$$2C_H \times D_M < F_C \times d < 5 C_H \times D_M, \text{ wherein}$$

$F_C$ is a centrifugal force exerted on the intercalated mass during the rotation of the torsional damping device at 1000 rpm;

d is a distance from the center of mass (M) of the intercalated mass (6) to an axis that, when the single bearing element (12) is in contact with the median point (A), passes through the median point (A) and through an associated contact point (E) of the single bearing element (12) with the support (4);

$C_H$ is the frictional force between the intercalated mass (6) and the support (4) during a maximum axial acceleration of the support (4) caused by vibration of the torsional damping device during rotation;

$D_M$ (DM) is the maximum distance of the center of mass of the intercalated mass (6) from an axis (YY) that passes through a contact point (D) between the intercalated mass and the support, wherein the axis (YY) that passes through the contact point (D) between the intercalated mass and the support is perpendicular to a radial direction at the contact point (D).

6. The torsional damping device according to claim 2, wherein the median point (A) on the track corresponding to the associated oscillating pendulum mass (6, 8, 10, 30, 32) is offset in a same circumferential direction for all of the oscillating pendulum masses (6, 8, 10, 30, 32).

7. The torsional damping device according to claim 6, wherein:
    the median point (A) of the track is offset toward the first adjacent mass (8);
    the first terminal edge (14) of the intercalated mass (6) is an edge capable, during the rotation of the torsional damping device, of radially retaining the terminal edge (16) of the first adjacent mass (8);
    the terminal edge (20) of the second adjacent mass (10) is an edge capable, during the rotation of the torsional damping device, of radially retaining the second terminal edge (18) of the intercalated mass (6).

8. The torsional damping device according to claim 6, wherein the following condition is met for any of the oscillating pendulum masses:

$$2C_H \times D_M < F_C \times d < 5C_H \times D_M, \text{ wherein}$$

$F_C$ is a centrifugal force exerted on the intercalated mass during the rotation of the torsional damping device at 1000 rpm;

d is a distance from the center of mass (M) of the intercalated mass (6) to an axis that, when the single bearing element (12) is in contact with the median point (A), passes through the median point (A) and through an associated contact point (E) of the single bearing element (12) with the support (4);

$C_H$ is the frictional force between the intercalated mass (6) and the support (4) during a maximum axial acceleration of the support (4) caused by vibration of the torsional damping device during rotation;

$D_M$ (DM) is the maximum distance of the center of mass of the intercalated mass (6) from an axis (YY) that passes through a contact point (D) between the intercalated mass and the support, wherein the axis (YY) that passes through the contact point (D) between the intercalated mass and the support is perpendicular to a radial direction at the contact point (D).

9. The torsional damping device according to claim 2, wherein, for the intercalated mass (6):

the median point (A) of the track is offset toward the first adjacent mass (8);

the first terminal edge (14) of the intercalated mass (6) is an edge capable, during the rotation of the torsional damping device, of radially retaining the terminal edge (16) of the first adjacent mass (8);

the terminal edge (20) of the second adjacent mass (10) is an edge capable, during the rotation of the torsional damping device, of radially retaining the second terminal edge (18) of the intercalated mass (6).

10. The torsional damping device according to claim 9, wherein the following condition is met for any of the oscillating pendulum masses:

$$2C_H \times D_M < F_C \times d < 5C_H \times D_M, \text{ wherein}$$

$F_C$ is a centrifugal force exerted on the intercalated mass during the rotation of the torsional damping device at 1000 rpm;

d is a distance from the center of mass (M) of the intercalated mass (6) to an axis that, when the single bearing element (12) is in contact with the median point (A), passes through the median point (A) and through an associated contact point (E) of the single bearing element (12) with the support (4);

$C_H$ is the frictional force between the intercalated mass (6) and the support (4) during a maximum axial acceleration of the support (4) caused by vibration of the torsional damping device during rotation;

$D_M$ (DM) is the maximum distance of the center of mass of the intercalated mass (6) from an axis (YY) that passes through a contact point (D) between the intercalated mass and the support, wherein the axis (YY) that passes through the contact point (D) between the intercalated mass and the support is perpendicular to a radial direction at the contact point (D).

11. The torsional damping device according to claim 9, wherein the following condition is met for the intercalated mass (6):

$$0.5 \times R1 < R2 < 2 \times R1, \text{ wherein}$$

R1 is a radius of curvature of the track at the median point (A);

R2 is a radius of curvature of the terminal edge (20) of the second adjacent mass (10) at a contact point with the second terminal edge (18) of the intercalated mass (6) when the single bearing element (12) is in contact with the median point (A).

12. The torsional damping device according to claim 2, wherein the following condition is met:

$$2C_H \times D_M < F_C \times d < 5C_H \times D_M, \text{ wherein}$$

$F_C$ is a centrifugal force exerted on the intercalated mass during the rotation of the torsional damping device at 1000 rpm;

d is a distance from the center of mass (M) of the intercalated mass (6) to an axis that, when the single bearing element (12) is in contact with the median point (A), passes through the median point (A) and through an associated contact point (E) of the single bearing element (12) with the support (4);

$C_H$ is the frictional force between the intercalated mass (6) and the support (4) during a maximum axial acceleration of the support (4) caused by vibration of the torsional damping device during rotation;

$D_M$ (DM) is the maximum distance of the center of mass of the intercalated mass (6) from an axis (YY) that passes through a contact point (D) between the intercalated mass and the support, wherein the axis (YY) that passes through the contact point (D) between the intercalated mass and the support is perpendicular to a radial direction at the contact point (D).

13. The torsional damping device according to claim 12, wherein the distance d is between 2 mm and 12 mm.

14. The torsional damping device according to claim 1, wherein the intercalated mass (6) is capable of performing a circumferential deflection of between 0.5 and 6 mm with each of the first (8) and second (10) adjacent masses.

15. The torsional damping device according to claim 1, wherein a number of the oscillating pendulum masses (6, 8, 10, 20, 32) is an odd number greater than or equal to 3.

16. A clutch comprising a torsional damping device, wherein the torsional damping device is in accordance with claim 1.

17. The torsional damping device according to claim 3, wherein the median point (A) on the track corresponding to the associated oscillating pendulum mass is offset angularly with respect to the center of mass (M) of the associated oscillating pendulum mass in the same circumferential direction for all the oscillating pendulum masses (6, 8, 10, 30, 32).

* * * * *